Dec. 6, 1966 R. WASYLUK 3,289,276
METHOD OF PRODUCING ELECTRICAL CIRCUITS
Filed April 11, 1962 4 Sheets-Sheet 1

INVENTOR.
Rostislav Wasyluk
BY

Dec. 6, 1966 R. WASYLUK 3,289,276
METHOD OF PRODUCING ELECTRICAL CIRCUITS
Filed April 11, 1962 4 Sheets-Sheet 2

INVENTOR.
Rostislav Wasyluk
BY
Richard Groub
Agt

Dec. 6, 1966   R. WASYLUK   3,289,276
METHOD OF PRODUCING ELECTRICAL CIRCUITS
Filed April 11, 1962   4 Sheets-Sheet 4

INVENTOR.
Rostislav Wasyluk
BY

United States Patent Office 3,289,276
Patented Dec. 6, 1966

3,289,276
METHOD OF PRODUCING ELECTRICAL CIRCUITS
Rostislav Wasyluk, Prague, Czechoslovakia, assignor to Tesla, národní podnik, Prague, Czechoslovakia
Filed Apr. 11, 1962, Ser. No. 186,737
Claims priority, application Czechoslovakia,
Apr. 21, 1961, 2,473/61
10 Claims. (Cl. 29—155.5)

This invention relates to a method of producing electrical circuits according to desired circuit schemes containing resistances and capacities of desired values and combinations and eventually, but not necessarily, also inductances and semiconductors.

Electrical circuits containing resistances and capacities of desired values according to predetermined circuit schemes are produced in a wide range of combinations in many branches of electrical engineering, electronics, computing techniques, etc. The most common manner of producing such circuits is to select single circuit elements as indicated in the circuit scheme, that means resistors, capacitors, coils, etc. and to join them electrically as indicated in the circuit scheme, for instance by cabling, by direct soldering etc. One of the important trends of modern electrical engineering is to minimize the dimensions of such circuits. Several methods have been already proposed for replacing certain combinations of circuit elements by single units of smaller size. For instance, it is already known to produce miniature circuit components in such a manner that a body made of insulating material bears on one of its surfaces a film made of a resistance material and on its opposite side a film made of a conductive material, such body having the properties of a combination of a capacity and a resistance. The disadvantage of this method is in that it is necessary to apply thin films to the body from two opposite sides, which process is comparatively complicated and expensive. Moreover, such bodies can replace only a simple series combination of a resistor and a capacitor, being unable to replace other combinations which may be desirable in building-up electric circuits according to predetermined schemes.

It is also known to pile up different materials over each other and to utilize the different properties of such materials in order to obtain in the interior of one or more of them or on their contacting surfaces certain desired electrical effects. Such combinations, sometimes called "function blocks" are known in different arrangements. It is for instance known that for some parameters a combination of a resistor and a capacitor may be replaced by a combination of two superimposed bodies with different specific resistances. The contacting surface of such bodies shows a capacitive effect so that the combination of the two bodies forms an RC-member. Another known function block consists of three superimposed layers of different materials selected in such a manner that the first layer consists of a resistance material, the second layer consists of an electrically insulating material not being, however, a thermal insulator, and the third layer is made of thermoelectric material. Alternating current is supplied to the first layer, thereby heating the material of this layer. The developing heat passes through the second layer into the third layer where a direct voltage is produced by Seebeck effect owing to the heating of this layer. This known function block may serve therefore as a rectifier.

The object of the invention is to reduce the dimensions of electric circuits by a new, very simple, reliable and inexpensive method and thus to reduce also the production costs of electric devices.

The new method according to the invention consists in replacing at least one desired combination of one or more resistances and one or more capacitors by a solid body made of a single dielectric material whose loss factor is greater than 0.1, the properties of the dielectric material and the shape of it being chosen so as to satisfy predetermined relations in respect to the values of the resistances and the capacities of the desired combination.

The term "dielectric material" is to be understood to denote materials whose electrical conductivity is smaller or at most equal to $10^{-1}$ ohm$^{-1}$cm.$^{-1}$.

The term "loss factor" denotes the tangent of the dielectric loss angle of the respective material.

The properties of the dielectric material which must be chosen suitably to satisfy predetermined relations in respect to the values of the resistances and capacities of the desired combination are:

Optical permittivity $e_r$, that means the asymptotic value of permittivity for an infinitely great frequency, practically for optical frequencies.

Statical permittivity $e_s$, that means the dielectric constant of the material measured for direct voltage.

Optical conductivity $g_r$, that means the asymptotic value of electrical conductivity for an infinitely high frequency, practically for optical frequencies.

Electrical conductivity $g_s$, that means conductivity of the material for direct current.

Relaxation time $t$ of the dipoles of the material, that means the time-constant of the return molecular dipoles of the respective material to their rest position after the removal of the external electric field.

The predetermined relations which are to be satisfied by the properties and by the shape of the dielectric body are different for different combinations of resistances and capacities which are to be replaced according to the invention by a single body of dielectric material. Details are given below with reference to the accompanying drawings. However, in each case the method comprises two steps, the first being the choice of a suitable dielectric material and the second being the shaping of this material into a body of suitable dimensions, both the properties and the shape being determined by mathematic formulae depending on the various combinations covered by the invention.

It is to be stressed that the new method differs from the known methods cited above in that simple or more complicated combinations of resistances and capacities are replaced according to the invention by a single, homogeneous body made of a single dielectric material whereas the known methods use at least two bodies of different materials in order to achieve the same effect.

Although the main feature of the invention consists in replacing a combination of resistances and capacities by a body made of a single dielectric material, it is possible to replace in a given circuit not only one such combination but also several combinations in said manner. In such cases each of these combinations is replaced by a body of a single dielectric material with a loss factor greater than 0.1 but the dielectric material which replaces one combination may be different from the dielectric material replacing another combination.

According to a further feature of the invention, the solid bodies of dielectric materials may be placed into a magnetic field generated by one or several induction elements.

The electric circuit made in accordance with the novel method may be arranged in such a manner that the bodies of dielectric materials with a loss factor greater than 0.1 have the shape of flat plates, prisms, cylinders or cylindrical sectors, the opposite surfaces of these bodies being provided with conductive coatings and the bodies being electrically connected with each other by the contact of said coatings. The conductive coatings need not cover the whole area of the opposite surfaces of the bodies but may occupy only a portion of these surfaces. The conductive coatings of the bodies may be also permanently joined together, for instance by soldering.

In addition to bodies made of dielectric materials with a loss factor greater than 0.1, the circuits may comprise also other bodies, for instance bodies of dielectric materials whose loss factor is equal to or smaller than 0.1, and/or bodies made of resistance materials, and/or semiconductors and/or resistance materials. Also such bodies may be provided on their opposite surfaces with electrically conductive coatings and may be connected with each other directly by these coatings.

The bodies of dielectric materials and/or of semiconductors and/or of resistance materials, provided with conductive coatings on their opposite surfaces, may be laid side by side and over each other in several layers. The bodies superimposed in different layers may have plan areas of the same shape or of different shapes, thus partly overlapping each other.

Other features and details of the invention will now be explained in detail with reference to the accompanying drawings, in which.

Figure 1:
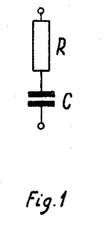
FIGS. 1 to 10 show different combinations of resistances and capacities which may be replaced according to the invention by a single body of dielectric material with a loss factor greater than 0.1.

FIG. 1 shows a series combination of a resistance R and a capacity C. The method of the invention consists in replacing this combination by a solid body made of a single dielectric material whose loss factor is greater than 0.1, the method comprising the steps of choosing a dielectric material of the said kind whose electrical conductivity $g_s$, optical permittivity $e_r$, statical permittivity $e_s$ and relaxation time $t$ of its dipoles satisfy the conditions $$g_s \leq 10^{-10} \text{ ohm}^{-1} \text{ cm.}^{-1}, \frac{e_s}{e_r} \geq 1000, t = R \cdot C$$

and $$t \leq \frac{1}{2\pi f_m} \cdot \sqrt{\frac{1}{100}\left(\frac{e_s}{e_r}\right)^2 - 1}$$

where $f_m$ is the highest frequency for which the circuit is to be used, and making thereafter a body of this selected material so that the thickness A of the body, measured in the direction of the electric field to be applied to it, and the cross-sectional area S of the body measured perpendicularly to the aforesaid direction satisfy the condition $$S = A \cdot \frac{C}{e_s}$$

As it may be seen from the last formula, one of the values A or S may be chosen arbitrarily, whereafter the other value must be chosen so as to satisfy the relation $$S = A \cdot \frac{C}{e_s}$$

In practice, it is convenient to choose the value of A as small as possible, with respect to mechanical strength of the material, whereafter the value of S is calculated from the given formula. The same remark applies also to all subsequent examples given below.

For instance, the desired value may be $R = 25$ kilohms, and $C = 40$ nanofarads. Such series combinations are used in so-called physiological volume controls of radio receivers, the maximum used frequency being $f_m = 12$ kc./s. According to the invention, such combination may be replaced by a body of a single dielectric material, for instance of barium titanate, having the following properties: $e_s = 10000\ e_o$, $e_r = 9.6\ e_o$, $t = 10^{-3}$ sec., $g_s = 10^{-10}$ ohm$^{-1}$ cm.$^{-1}$, so that the relaxation time $t$ satisfies the inequality $t < 1.38 \times 10^{-3}$ sec. for $f_m = 12$ kc./s. Such materials are known and it offers no particular difficulty to find a material having the necessary parameters indicated above.

The letter $e_o$ denotes here and elsewhere in the specification the permittivity of vacuum, $e_o = 8.85 \times 10^{-14}$ F./cm. All numerical values are indicated in the MKSA system of units (Giorgi).

The second step of the method consists in making a body of the selected dielectric material so as to satisfy the formula $$S = A \cdot \frac{C}{e_s}$$

With regard to the mechanical rigidity of the selected material and to its workability it is suitable to choose for instance $A = 0.2$ mm., so that the necessary cross-sectional area of the body will be $S = 181$ mm.$^2$, that means the body may be for instance a disk with a diameter of approximately 15 mm. and a thickness of 0.2 mm.

For other values of R and C, for instance $R = 500$ kilohms, $C = 200$ nanofarads, the suitable properties of the diaelectric material will be $g_s = 8 \times 10^{-11}$ ohm.$^{-1}$ cm.$^{-1}$, $e_s = 20000\ e_o$, $e_r = 8\ e_o$ $t = 10^{-1}$ sec., $A = 0.2$ mm., $S = 2.26$ cm.$^2$ The body may be therefore a disk with a diameter of 17 mm. and a thickness of 0.2 mm. An RC series combination with these properties may be used for instance in telephony as a delay line.

Figure 2:
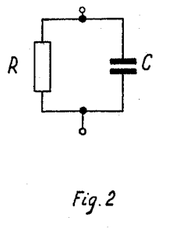

FIG. 2 shows a parallel combination of a resistance R and a capacity C. The method of the invention consists in replacing this combination by a solid body made of a single dielectric material whose loss factor is greater than 0.1, the method comprising the steps of choosing a dielectric material of the said kind whose statical permittivity $e_s$, electrical conductivity $g_s$ and relaxation time $t$ of its dipoles satisfy the conditions $$\frac{e_s}{g_s} = C \cdot R \text{ and } t \leq \frac{1}{20\pi f_m}$$

where $f_m$ is the highest frequency for which the circuit is to be used, and making thereafter a body of this selected material so that the thickness A of the body, measured in the direction of the electric field to be applied to it, and the cross-sectional area S of the body measured perpendicularly to the aforesaid direction satisfy the condition $$S = \frac{A}{R \cdot g_s}$$

The desired values may be $R = 150$ ohms, $C = 50$ microfarads, $f_m = 6$ kc./s. Such parallel combinations are used in cathode circuits of electron tubes in amplifier stages. Up to now electrolytic condensers were commonly used for this purpose. According to the invention it is possible to replace this combination by a disk of a single dielectric material, for instance of a mixed ferrite, having $$e_s = 670000 \ e_0, \ g_s = 7.9 \times 10^{-6} \text{ ohm}^{-1} \text{ cm.}^{-1}$$

$$t = 2 \times 10^{-6} \text{ sec.}, \ A = 0.2 \text{ mm.}, \ S = 16.9 \text{ cm.}^2$$

Parallel combinations of R and C members are shown in FIG. 2 are further used in detection circuits of stereo super-heterodyne receivers, the desired values of R and C being for instance $R = 47$ kilohms, $C = 100$ picofarads, $f_m = 10$ kc./s. The following values will satisfy these conditions:

$$e_s = 11500 \ e_0, \ g_s = 2.19 \times 10^{-4} \text{ ohm}^{-1} \text{ cm.}^{-1}$$

$$t = 1.2 \times 10^{-6} \text{ sec.}, \ A = 2 \text{ mm.}, \ S = 2 \text{ mm.}^2$$

Figure 3:
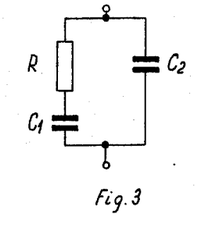

FIG. 3 shows a parallel combination of two elements, the first element being a capacity $C_2$ and the second element being a series connection of a resistance R and a capacity $C_1$. The method according to the invention consists in replacing this combination by a solid body made of a single dielectric material whose loss factor is greater than 0.1, the method comprising the steps of choosing a dielectric material of the said kind whose electrical conductivity $g_s$, statical permittivity $e_s$, optical permittivity $e_r$ and relaxation time $t$ of its dipoles satisfy the conditions $$g_s \leq 10^{-10} \text{ ohm}^{-1}\text{cm.}^{-1}$$

$$\frac{e_s}{e_r} = 1 + \frac{C_1}{C_2}$$

$$t = R \cdot C_1$$

and making thereafter a body of this selected material so that the thickness A of the body, measured in the direction of the electric field to be applied to it, and the cross-sectional area S of the body measured perpendicularly to the aforesaid direction satisfy the condition $$S = A \cdot \frac{C_1 + C_2}{e_s}$$

Such combinations are used in television receivers where the desired values may be for instance $C_1 = 3$ nanofarads, $R = 1$ kilohm, $C_2 = 500$ picofarads. According to the invention it is possible to replace such combination by a body of a single dielectric material, for instance of barium titanate, having $$g_s = 10^{-10} \text{ ohm}^{-1}\text{cm.}^{-1}$$

$$e_s = 2000 \ e_0, \ e_r = 285 e_0, \ t = 3 \times 10^{-6} \text{ sec.}$$

$$A = 0.2 \text{ mm.}, \ S = 40 \text{ mm.}^2$$

Figure 4:
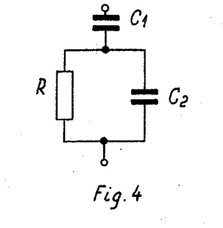

FIG. 4 shows a series combination of two elements, the first element being a capacity $C_1$ and the second element being a parallel combination of a resistance R and a capacity $C_2$. The method according to the invention consists in replacing this combination by a solid body made of a single dielectric material whose loss factor is greater than 0.1, the method comprising the steps of choosing a dielectric material of the said kind whose electrical conductivity $g_s$, statical permittivity $e_s$, optical permittivity $e_r$ and relaxation time $t$ of its dipoles satisfy the conditions $$g_s \leq 10^{-8} \text{ ohm}^{-1}\text{cm.}^{-1}$$

$$\frac{e_s}{e_r} = 1 + \frac{C_1}{C_2}$$

$$t = R \cdot (C_1 + C_2)$$

and making thereafter a body of this selected material so that the thickness A of the body, measured in the direction of the electric field to be applied to it, and the cross-sectional area S of the body measured perpendicularly to the aforesaid direction satisfy the condition $$S = A \cdot \frac{C_1}{e_s}$$

Such combinations are used in television receivers and the desired values may be for instance $C_1 = 120$ picofarads, $R = 0.22$ megohms, $C_2 = 150$ picofarads. According to the invention it is possible to replace such a combination by a body of a single dielectric material, for instance of ceramic material, having $$g_s = 10^{-9} \text{ ohm}^{-1}\text{cm.}^{-1}, \ e_s = 5.5 e_0$$

$$e_r = 3 e_0, \ t = 6.77 \times 10^{-5} \text{ sec.}$$

$$A = 0.2 \text{ mm.}, \ S = 5 \text{ cm.}^2$$

Figure 5:
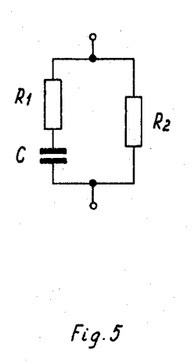

FIG. 5 shows a parallel combination of two elements, the first element being a resistance $R_2$ and the second element being a series connection of a resistance $R_1$ and a capacity $C_1$. The method according to the invention consists in replacing this combination by a solid body made of a single dielectric material whose loss factor is greater than 0.1, the method comprising the steps of choosing a dielectric material of the said kind whose electrical conductivity $g_s$, optical conductivity $g_r$ and relaxation time $t$ of its dipoles satisfy the conditions $$\frac{g_r}{g_s} = 1 + \frac{R_2}{R_1}$$

$$t = R_1 \cdot C$$

and making thereafter a body of this selected material so that the thickness A of the body, measured in the direction of the electric field to be applied to it, and the cross sectional area S of the body measured perpendicularly to the aforesaid direction satisfy the condition $$S = \frac{A}{R_2 g_s}$$

Such combinations are used in correcting circuits of pickups and the desired values may be for instance $R_1 = 330$ kilohms, $R_2 = 2.2$ megohms and $C = 22$ picofarads. According to the invention such combination may be replaced by a body of a single dielectric material, for instance of ferrite, having $$g_s = 2.27 \times 10^{-6} \text{ ohm}^{-1}\text{cm.}^{-1}, \ g_r = 1.74 \times 10^{-5}$$

$$t = 7.26 \times 10^{-6} \text{ sec.}, \ A = 0.5 \text{ mm.}, \ S = 1 \text{ mm.}^2$$

Figure 6:
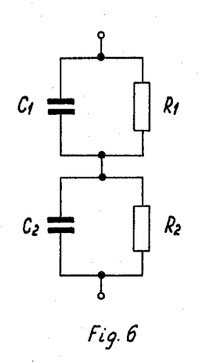

FIG. 6 shows a series combination of two elements, the first element being a parallel connection of a resistance $R_1$ and a capacity $C_1$ and the second element being parallel connection of a resistance $R_2$ and a capacity $C_2$. The method according to the invention consists in replacing this combination by a solid body made of a single dielectric material whose loss factor is greater than 0.1, the method comprising the steps of choosing a dielectric material of the said kind whose optical conductivity $g_r$, electrical conductivity $g_s$, optical permittivity $e_r$ and relaxation time $t$ of its dipoles satisfy the conditions $$\frac{g_r}{g_s} = \frac{(C_1^2 R_1 + C_2^2 R_2)(R_1 + R_2)}{R_1 R_2 (C_1 + C_2)^2}$$

$$\frac{g_s}{e_r} = \frac{C_1 + C_2}{C_1 C_2 (R_1 + R_2)}$$

$$t = \frac{R_1 R_2 (C_1 + C_2)}{R_1 + R_2}$$

and making thereafter a body of this selected material so that the thickness A of the body, measured in the direction of the electric field to be applied to it, and the cross-sectional area S of the body measured perpendicularly to the aforesaid direction satisfy the condition $$S = \frac{A}{g_s(R_1+R_2)}$$

Such combinations occur in electric filters, the desired values being for instance $R_1=1.5$ megohms, $C_1=10$ nanofarads, $R_2=1$ kilohm, $C_2=2$ microfarads. According to the invention such combination may be replaced by a single body of dielectric material, for instance of spinel or of barium titanate, having $$g_r = 1.1 \times 10^{-5} \text{ ohm}^{-1}\text{cm.}^{-1}$$

$$g_s = 1.07 \times 10^{-8} \text{ ohm}^{-1}\text{cm.}^{-1}$$

$e_r=300 e_0$, $t=1.2 \times 10^{-5}$ sec., $A=0.2$ mm., $S=1.25$ cm.$^2$

Figure 7:
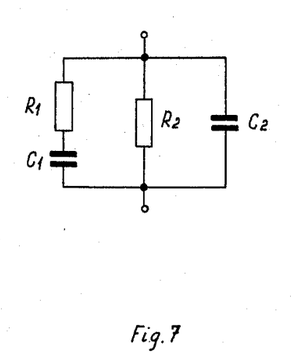

FIG. 7 shows a parallel combination of three elements, the first element being a resistance $R_2$, the second being a capacity $C_2$ and the third being a series connection of a resistance $R_1$ and a capacity $C_1$. The method according to the invention consists in replacing this combination by a solid body made of a single dielectric material whose loss factor is greater than 0.1, the method comprising the steps of choosing a dielectric material of the kind whose optical conductivity $g_r$, electrical conductivity $g_s$, optical permittivity $e_r$ and relaxation time $t$ of its dipoles satisfy the conditions $$\frac{g_r}{g_s} = 1 + \frac{R_2}{R_1}$$

$$\frac{e_r}{g_s} = R_2 \cdot C_2$$

$$t = R_1 \cdot C_1$$

and making thereafter a body of this selected material so that the thickness A of the body, measured in the direction of the electric field to be applied to it, and the cross-sectional area S of the body measured perpendicularly to the aforesaid direction satisfy the condition $$S = \frac{A}{g_s \cdot R_2}$$

Such combinations are used in cathode circuits of electron tubes in video amplifiers of television receivers, where the desired values may be for instance $R_1=47$ ohms, $C_1=5$ nanofarads, $R_2=47$ ohms, $C_2=2$ nanofarads. According to the invention such combination may be replaced by a body of a single dielectric material, for instance of spinel, having $g_r=5.6 \times 10^{-4}$ ohm$^{-1}$cm.$^{-1}$, $g_s=2.8 \times 10^{-4}$ ohm$^{-1}$cm.$^{-1}$, $e_r=300\ e_0$, $t=2.35 \times 10^{-7}$ sec., $A=0.2$ mm., $S=1.52$ cm.$^2$.

Figure 8:
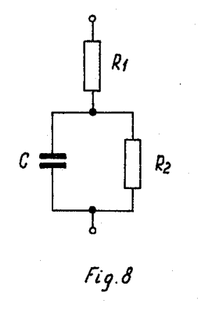

FIG. 8 shows a series combination of two elements, the first element being a resistance $R_1$ and the second element being a parallel connection of a resistance $R_2$ and a capacity $C$. The method according to the invention consists in replacing this combination by a solid body made of a single dielectric material whose loss factor is greater than 0.1, the method comprising the steps of choosing a dielectric material of the said kind, whose optical conductivity $g_r$, electrical conductivity $g_s$ and relaxation time $t$ of its dipoles satisfy the conditions $$\frac{g_r}{g_s} = 1 + \frac{R_2}{R_1}$$

$$t = C \cdot \frac{R_1 R_2}{R_1 + R_2}$$

and making thereafter a body of this selected material so that the thickness A of the body, measured in the direction of the electric field to be applied to it, and the cross-sectional area S of the body measured perpendicularly to the aforesaid direction satisfy the condition $$S = \frac{A}{g_s(R_1+R_2)}$$

Such combinations occur in cathode circuits of television receivers and the desired values may be for instance $R_1=33$ ohms, $R_2=180$ ohms, $C=3300$ picofarads. According to the invention such combination may be replaced by a body of a single dielectric material, having $g_r=1.26 \times 10^{-1}$ ohm$^{-1}$cm.$^{-1}$, $g_s=2 \times 10^{-2}$ ohm$^{-1}$cm.$^{-1}$, $t=9.23 \times 10^{-8}$ sec., $A=0.5$ mm., $S=1.2$ mm.$^2$.

Figure 9:
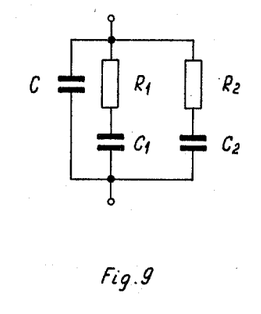

FIG. 9 shows a parallel combination of more than two elements, the first element being a capacity C and each of the other elements being a series connection of a resistance $R_1$ or $R_2$, respectively, and a capacity $C_1$ or $C_2$, respectively. Although only two such elements $R_1$, $C_1$ and $R_2$, $C_2$ are shown in FIG. 9, there may be in general $n$ such elements $R_i$, $C_i$ ($n=1,2, \ldots n$) the whole parallel combination comprising then $n+1$ elements (including the capacity C). The method according to the invention consists in replacing this combination by a solid body made of a single dielectric material with a loss factor greater than 0.1 and with $n$ relaxation times $t_i$ ($i=1, \ldots n$) the method comprising the steps of choosing a dielectric material whose optical permittivity $e_r$, statical permittivity $e_s$, optical conductivity $g_r$ and relaxation times $t_i$ of its dipoles ($i=1, \ldots n$) satisfy the conditions $$\frac{e_s}{e_r} = \frac{1}{C}(C + C_1 + \ldots + C_n)$$

$$\frac{e_r}{g_r} = \frac{C}{\frac{1}{R_1} + \ldots + \frac{1}{R_n}}$$

$$t_i = R_i \cdot C_i \ (i=1, \ldots n)$$

and making thereafter a body of this selected material so that the thickness A of the body, measured in the direction of the electric field to be applied to it, and the cross-sectional area S of the body measured perpendicularly to the aforesaid direction satisfy the condition $$S = A \cdot \frac{C}{e_r}$$

Such combinations are used in filtering circuits, the desired values being for instance $C=50$ picofarads, $R_1=1$ kilohm, $C_1=230$ picofarads, $R_2=2.5$ megohms, $C_2=3000$ picofarads. According to the invention such combinations may be replaced by a body of a single dielectric material having two types of dipoles, for instance of a ferroelectric material of the said kind, having $e_r=300\ e_0$, $e_s=19500\ e_0$, $g_r=5.26 \times 10^{-4}$ ohm$^{-1}$cm.$^{-1}$, $t_1=2.3 \times 10^{-7}$ sec., $t_2=7.5 \times 10^{-3}$ sec., $A=0.2$ mm., $S=3.8$ mm.$^2$.

Figure 10:
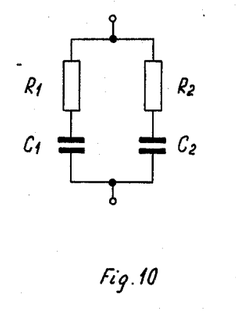

FIG. 10 shows a parallel combination of two elements, each of which is a series connection of a resistance $R_1$ or $R_2$ and a capacity $C_1$ or $C_2$, respectively. Although only two such elements $R_1$, $C_1$ and $R_2$, $C_2$ are shown in the drawing, there may be generally $n$ such elements $R_i$, $C_i$ ($i=1, 2, \ldots n$). The method according to the invention consists in replacing this combination by a solid body made of a single dielectric material with a loss factor greater than 0.1 and with $n$ relaxation times $t_i$ ($i=1, \ldots n$), the method comprising the steps of choosing a dielectric material whose optical permittivity $e_r$, statical permittivity $e_s$, optical conductivity $g_r$ and relaxation times $t_i$ of its dipoles ($i=1, \ldots n$) satisfy the conditions $$e_r \leq 0.001 e_s,$$

$$\frac{e_s}{g_r} = \frac{C_1 + \ldots + C_n}{\frac{1}{R_1} + \ldots + \frac{1}{R_n}},$$

$$t_i = R_i \cdot C_i \ (i=1, \ldots n)$$

and making thereafter a body of this selected material so that the thickness A of the body, measured in the direction of the electric field to be applied to it, and the cross-sectional area S of the body measured perpendicularly to the aforesaid direction satisfy the condition $$S = \frac{A}{g_r}\left(\frac{1}{R_1} + \ldots + \frac{1}{R_n}\right)$$

Such combinations are used in filtering circuits and the desired values may be for instance $C_1 = 5$ nanofarads, $R_1 =$ kilohm, $C_2 = 150$ nanofarads, $R_2 = 0.2$ megohms. According to the invention such combination may be replaced by a body of a single dielectric material, for instance of a mixed ferroelectric material with two types of dipoles, having $e_r = 300\ e_o$, $e_s = 54700\ e_o$, $g_r = 3.13 \times 10^{-5}$ ohm$^{-1}$cm.$^{-1}$, $t_1 = 5 \times 10^{-6}$ sec.

$t_2 = 3 \times 10^{-2}$ sec.

Figure 11:
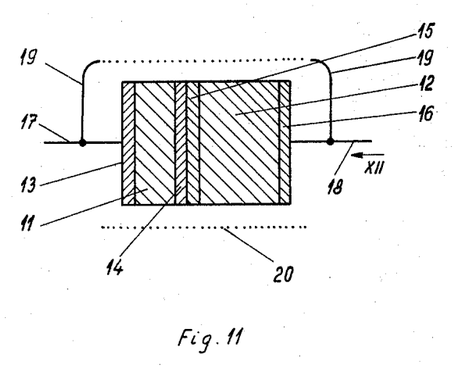
FIG. 11 shows in longitudinal section an embodiment of a circuit element made according to the invention.
Figure 12:
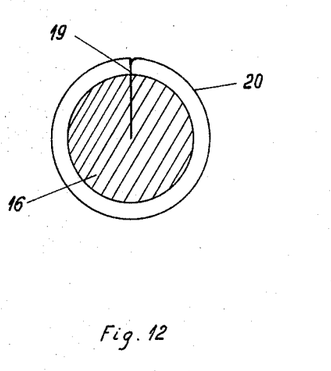
FIG. 12 is a front view of the same embodiment, in the direction of the arrow XII marked in FIG. 11.

Bodies of dielectric materials may be placed into a magnetic field generated by an induction element. This arrangement is shown diagrammatically in FIGS. 11 and 12. Bodies 11 and 12 of dielectric materials with a high loss-factor have conductive coatings 13, 14, 15 and 16 on their opposite surfaces. These coatings are shown with exaggerated thickness in FIG. 11. The two bodies 11 and 12 contact each other directly with their conductive coatings 14 and 15. The outer coatings 13, 16 of these bodies are connected to leads 17, 18 which themselves are connected for instance to a power source (not shown). Parallel to bodies 11, 12 is connected a winding 20 over a tapping 19, the winding 20 generating a magnetic field which surrounds the bodies 11 and 12. By this arrangement it is possible to utilize not only the permittivity of the bodies 11 and 12 but also their permeability and the frequency response of their permittivities and permeabilities. In addition to winding 20 it is possible to arrange a further winding, not shown in the drawing, serving to adjust the intensity of the magnetic field independently of the magnetic field generated by the winding 20.

Figure 13:
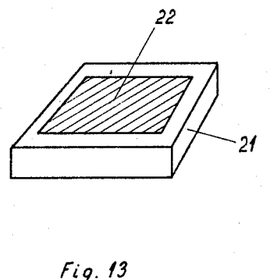
FIG. 13 is a perspective view of a body made according to the invention with conductive coatings.
Figure 14:
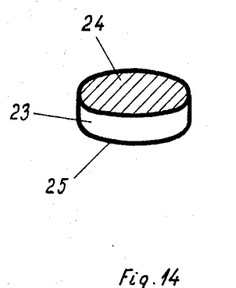
FIG. 14 shows another embodiment of a body made according to the invention.

Single bodies of high loss-factor dielectric materials may have the shape of flat plates or prisms, as shown in FIG. 13, or a cylindrical shape, as shown in FIG. 14, or other shapes.

Body 21 in the shape of a flat plate, shown in FIG. 13, has conductive coatings 22 on its two opposite surfaces. These coatings do not cover the whole area of the opposite surfaces of body 21 and do not reach therefore its borders. For this reason, only the coating 22 on the upper surface of this body is visible in FIG. 13.

Body 23 of cylindrical shape, shown in FIG. 14, has on its opposite surfaces conductive coatings 24, 25 covering the whole area of these parallel surfaces of body 23.

As already mentioned, circuits in which at least one combination of resistances and capacities is replaced according to the invention by a body made of a single dielectric material of a high loss-factor may contain also bodies consisting of materials with a loss-factor lower than or equal to 0.1, and/or of resistance materials and/or of semiconductors. Such bodies may also bear conductive coatings on their opposite surfaces and may be assembled side by side and over each other in a mosaic-like manner.

Figure 15:
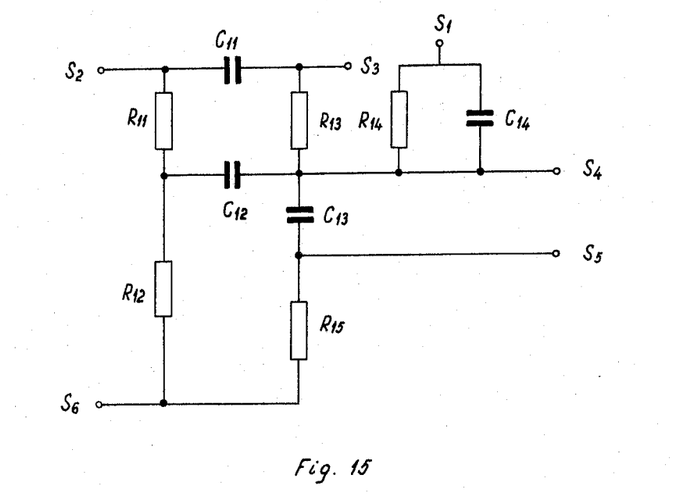
FIG. 15 shows a circuit diagram of a more complicated electrical circuit which may be replaced according to the invention by an assembly of superimposed bodies.
Figure 16:
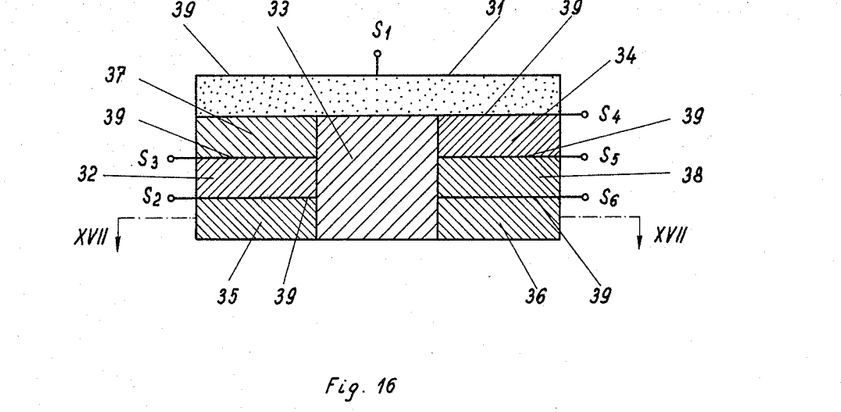
FIG. 16 is a cross-sectional view of the assembly replacing the circuit shown in FIG. 15.
Figure 17:
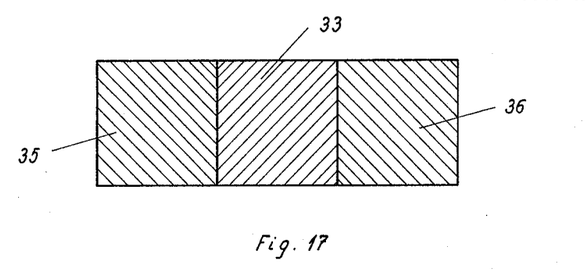
FIG. 17 is a sectional view of the assembly shown in FIG. 16, along the line XVII—XVII marked in FIG. 16.

FIG. 15 shows a relatively complicated circuit diagram comprising five resistances $R_{11}$ to $R_{15}$, four capacities $C_{11}$ to $C_{14}$ and six terminals $S_1$ to $S_6$. FIGS. 16 and 17 show how it is possible to assemble this circuit according to the invention from bodies made of high-loss dielectric materials, low-loss dielectric materials and resistance materials. The parallel combination of resistance $R_{14}$ and capacity $C_{14}$ is replaced according to the invention by a body 31 of a single high-loss dielectric material, as it was explained with reference to FIG. 2 of the accompanying drawings. Capacity $C_{11}$ is represented by a body 32 of a low-loss dielectric material. Similarly, capacity $C_{12}$ is represented by a body 33, capacity $C_{13}$ by a body 34, both of low-loss dielectric materials. Resistance $R_{11}$ is represented by a body 35 made of resistance material. Similarly, resistance $R_{12}$ is represented by a body 36, resistance $R_{13}$ by a body 37 and resistance $R_{15}$ by a body 38, all made of resistance materials. Terminals $S_1$ to $S_6$ are denoted with the same reference numerals as in FIG. 15. Thick lines 39 between the bodies represent conductive coatings of the bodies.

As it may be appreciated from FIGS. 16 and 17, the bodies of high-loss dielectric materials, of low-loss dielectric materials and of resistance materials are laid side by side and over each other in several layers. In the embodiment shown here the layers are four in number. The first, lowermost layer consists of bodies 35, 33, and 36, the body 33 protruding into two further superimposed layers. The second layer consists of bodies 32 and 38 together with body 33 and the third layer consists of bodies 37, 34, and 33. The fourth layer comprises only one body 31. As it may be seen, the superimposed bodies have the same square shape of plan areas in the first, second and third layers, as shown in FIG. 17 for the lowermost layer, whereas the single body 31 in the fourth layer has a plan area of a different, oblong shape.

Figures 18, 19:
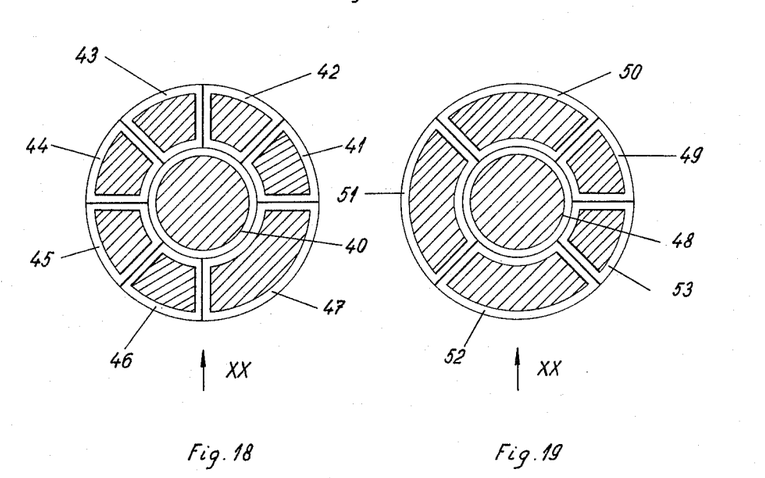
FIG. 18 is a top view of one layer of bodies laid side by side and provided with conductive coatings according to the invention.
FIG. 19 shows a similar layer of bodies with conductive coatings.
Figure 20:
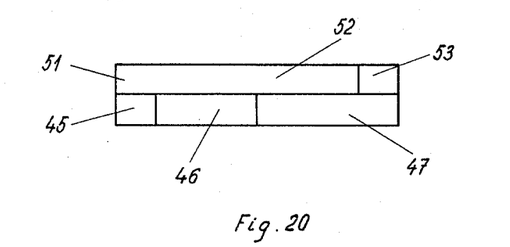
FIG. 20 shows the two layers superimposed, the view being taken in the direction of the arrow XX marked in FIGS. 18 and 19.

FIGS. 18 and 19 show another embodiment of two layers of superimposed bodies, each having a form of a flat plate. The first layer, shown in FIG. 18, consists of a central body 40 in the shape of a circular disk and of further bodies 41, 42, 43, 44, 45, 46, and 47, each being in the shape of a circular sector. The second layer, shown in FIG. 19, consists of a central body 48 in the shape of a circular disk and of further bodies 49, 50, 51, 52, and 53, each having a shape of a circular sector. Hatched areas on the surfaces of bodies 40 to 53 represent conductive coatings, not reaching the borders of the bodies. Bodies 40 to 53 have conductive coatings not only on their upper surfaces which are visible in FIGS. 18 and 19, but also on their undersides. Therefore, if layers 18 and 19 are superimposed, as shown in FIG. 20 in side elevation, taken in the direction of the arrows "XX" marked in FIGS. 18 and 19, the result is that for instance bodies 44 and 45 in the lower layer are electrically connected in parallel with body 51 in the upper layer, whereas for instance body 41 of the lower layer is connected in series with body 49 in the upper layer, etc. Also in this embodiment the superimposed bodies have different shapes of their plan areas in different layers.

What we claim is:

1. A method of making a passive electric network for periodic currents having frequencies within a desired frequency range, the network consisting in a series combination of a desired resistance R and a desired capacity C, the method comprising the steps of making a solid body of a single dielectric material whose loss factor is greater than 0.1 and whose electrical conductivity $g_s$, optical permittivity $e_r$, statical permittivity $e_s$ and relaxation time $t$ of its dipoles satisfy the conditions $$g_s \leq 10^{-10} \text{ ohm}^{-1} \text{ cm.}^{-1}$$

$$\frac{e_s}{e_r} \geq 1000, \quad t = R.C$$

and $$t \leq \frac{1}{2f_m} \cdot \sqrt{\frac{1}{100}\left(\frac{e_s}{e_r}\right)^2 - 1}$$

where $f_m$ is the highest frequency for which the network is to be used, shaping the solid body to such form that the thickness A of the body, measured in the direction of the electric field to be applied to it, and the cross-sectional area S of the body, measured perpendicularly to the aforesaid direction satisfy the condition $$S = A \cdot \frac{C}{e_s}$$

and making single conductive coatings on two opposite sides of the shaped body.

2. A method of making a passive electric network for for periodic currents having frequencies within a desired frequency range, the network consisting in a parallel combination of a desired resistance R and a desired capacity C, the method comprising the steps of making a solid body of a single dielectric material whose loss factor is greater than 0.1 and whose statical permittivity $e_s$, electrical conductivity $g_s$ and relaxation time $t$ of its dipoles satisfy the conditions $$\frac{e_s}{g_s} = C \cdot R$$

$$t \leq \frac{1}{20\pi f_m}$$

where $f_m$ is the highest frequency for which the network is to be used, shaping the solid body to such form that the thickness A of the body, measured in the direction of the electric field to be applied to it, and the cross-sectional area S of the body, measured perpendicularly to the aforesaid direction, satisfy the condition $$S = \frac{A}{R \cdot g_s}$$

and making single conductive coatings on two opposite sides of the shaped body.

3. A method of making a passive electric network for periodic currents having frequencies within a desired frequency range, the network consisting in a parallel combination of two elements, the first element being a desired capacity $C_2$ and the second element being a series connection of a desired resistance R and a desired capacity $C_1$, the method comprising the steps of making a solid body of a single dielectric material whose loss factor is greater than 0.1 and whose electrical conductivity $g_s$, statical permittivity $e_s$, optical permittivity $e_r$ and relaxation time $t$ of its dipoles satisfy the conditions $$g_s \leq 10^{-10} \text{ ohm}^{-1} \text{ cm.}^{-1}$$

$$\frac{e_s}{e_r} = 1 + \frac{C_1}{C_2}$$

$$t = R \cdot C_1$$

shaping the solid body to such form that the thickness A of the body, measured in the direction of the electric field to be applied to it, and the cross-sectional area S of the body, measured perpendicularly to the aforesaid direction satisfy the condition $$S = A \cdot \frac{C_1 + C_2}{e_s}$$

and making single conductive coatings on two opposite sides of the shaped body.

4. A method of making a passive electric network for periodic currents having frequencies within a desired frequency range, the network consisting in a series combination of two element, the first element being a desired capacity $C_1$ and the second element being a parallel connection of a desired resistance R and a desired capacity $C_2$, the method comprising the steps of making a solid body of a single dielectric material whose loss factor is greater than 0.1 and whose electrical conductivity $g_s$, statical permittivity $e_s$, optical permittivity $e_r$ and relaxation time $t$ of its dipoles satisfy the conditions $$g_s \leq 10^{-8} \text{ onm}^{-1} \text{ cm.}^{-1}$$

$$\frac{e_s}{e_r} = 1 + \frac{C_1}{C_2}$$

$$t = R \cdot (C_1 + C_2)$$

shaping the solid body to such form that the thickness A of the body, measured in the direction of the electric field to be applied to it, and the cross-sectional area S of the body, measured perpendicularly to the aforesaid direction satisfy the condition $$S = A \cdot \frac{C_1}{e_s}$$

and making single conductive coatings on two opposite sides of the shaped body.

5. A method of making a passive electric network for periodic currents having frequencies within a desired frequency range, the network consisting in a parallel combination of two elements, the first element being a desired resistance $R_2$ and the second being a series connection of a desired resistance $R_1$ and a desired capacity $C_1$, the method comprising the steps of making a solid body of a single dielectric material whose loss factor is greater than 0.1 and whose electrical conductivity $g_s$, optical conductivity $g_r$ and relaxation time $t$ of its dipoles satisfy the conditions $$\frac{g_r}{g_s} = 1 + \frac{R_2}{R_1}$$

$$t = R_1 \cdot C$$

shaping the solid body to such form that the thickness A of the body, measured in the direction of the electric field to be applied to it, and the cross-sectional area S of the body, measured perpendicularly to the aforesaid direction, satisfy the condition $$S = \frac{A}{R_2 g_s}$$

and making single conductive coatings on two opposite sides of the shaped body.

6. A method of making a passive electric network for periodic currents having frequencies within a desired frequency range, the network consisting in a series combination of two elements, the first element being a parallel connection of a desired resistance $R_1$ and a desired capacity $C_1$ and the second element being a parallel connection of a desired resistance $R_2$ and a desired capacity $C_2$, the method comprising the steps of making a solid body of a single dielectric material whose loss factor is greater than 0.1 and whose optical conductivity $g_r$, electrical conductivity $g_s$, optical permittivity $e_r$ and relaxation time $t$ of its dipoles satisfy the conditions $$\frac{g_r}{g_s} = \frac{(C_1^2 R_1 + G_2^2 R_2)(R_1 + R_2)}{R_1 R_2 (C_1 + C_2)^2}$$

$$\frac{g_s}{e_r} = \frac{C_1 + C_2}{C_1 C_2 (R_1 + R_2)}$$

$$t = \frac{R_1 R_2 (C_1 + C_2)}{R_1 + R_2}$$

shaping the solid body to such form that the thickness A of the body, measured in the direction of the electric field to be applied to it, and the cross-sectional area S of the body, measured perpendicularly to the aforesaid direction satisfy the condition $$S = \frac{A}{g_s(R_1 + _2)}$$

and making single conductive coatings on two opposite sides of the shaped body.

7. A method of making a passive electric network for periodic currents having frequencies within a desired frequency range, the network consisting in a parallel combination of 3 elements, the first element being a desired resistance $R_2$ the second being a desired capacity $C_2$ and the third being a series connection of a desired resistance $R_1$ and a desired capacity $C_1$, the method comprising the steps of making a solid body of a single dielectric material whose loss factor is greater than 0.1 and whose optical conductivity $g_r$, electrical conductivity $g_s$, optical permittivity $e_r$ and relaxation time $t$ of its dipoles satisfy the conditions $$\frac{g_r}{g_s} = 1 + \frac{R_2}{R_1}$$

$$\frac{e_r}{g_s} = R_2 . C_2$$

$$t = R_1 . C_1$$

shaping the solid body to such form that the thickness A of the body, measured in the direction of the electric field to be applied to it, and the cross-sectional area S of the body, measured perpendicularly to the aforesaid direction satisfy the condition $$S = \frac{A}{g_s . R_2}$$

and making single conductive coatings on two opposite sides of the shaped body.

8. A method of making a passive electric network for periodic currents having frequencies within a desired frequency range, the network consisting in a series combination of two elements, the first element being a desired resistance $R_1$ and the second being a parallel connection of a desired resistance $R_2$ and a desired capacity C, the method comprising the steps of making a solid body of a single dielectric material whose loss factor is greater than 0.1 and whose optical conductivity $g_r$, electrical conductivity $g_s$ and relaxation time $t$ of its dipoles satisfy the conditions $$\frac{g_r}{g_s} = 1 + \frac{R_2}{R_1}$$

$$t = C \cdot \frac{R_1 R_2}{R_1 + R_2}$$

shaping the solid body to such form that the thickness A of the body, measured in the direction of the electric field to be applied to it, and the cross-sectional area S of the body, measured perpendicularly to the aforesaid direction satisfy the condition $$S = \frac{A}{g_s(R_1 + R_2)}$$

and making single conductive coatings on two opposite sides of the shaped body.

9. A method of making a passive electric network for periodic currents having frequencies within a desired frequency range, the network consisting in a parallel combination of $n+1$ elements ($n \geq 2$), the first element being a desired capacity C and each of the other elements being a series connection of a desired resistance $R_i$ and a desired capacity $C_i$ ($i=1, \ldots n$), the method comprising the steps of making a solid body of a single dielectric material whose loss factor is greater than 0.1 and whose optical permittivity $e_r$, statical permittivity $e_s$, optical conductivity $g_r$ and $n$ relaxation times $t_i$ of its dipoles ($i=1, \ldots n$) satisfy the conditions $$\frac{e_s}{e_r} = \frac{1}{C}(C + C_1 + \ldots + C_n)$$

$$\frac{e_r}{g_r} = \frac{C}{\frac{1}{R_1} + \ldots + \frac{1}{R_n}}$$

$$t_i = R_i . C_i (i=1, \ldots n)$$

shaping the solid body to such form that the thickness A of the body, measured in the direction of the electric field to be applied to it, and the cross-sectional area S of the body, measured perpendicularly to the aforesaid direction satisfy the condition $$S = A \cdot \frac{C}{e_r}$$

and making single conductive coatings on two opposite sides of the shaped body.

10. A method of making a passive electric network for periodic currents having frequencies within a desired frequency range, the network consisting in a parallel combination of $n$ elements, each of these elements being a series connection of a desired resistance $R_i$ and a desired capacity $C_i$ ($i=1, \ldots n$), the method comprising the steps of making a solid body of a single dielectric material whose loss factor is greater than 0.1 and whose optical permittivity $e_r$, statical permittivity $e_s$, optical conductivity $g_r$ and $n$ relaxation times $t_i$ of its dipoles ($i=1, \ldots n$) satisfy the conditions $$e_r \leq 0.001 e_s$$

$$\frac{e_s}{g_r} = \frac{C_1 + \ldots + C_n}{\frac{1}{R_1} + \ldots + \frac{1}{R_n}}$$

$$t_i = R_i . C_i (i=1, \ldots n)$$

shaping the solid body to such form that the thickness A of the body, measured in the direction of the electric field to be applied to it, and the cross-sectional area S of the body, measured perpendicularly to the aforesaid direction satisfy the condition $$S = \frac{A}{g_r}\left(\frac{1}{R_1} + \ldots + \frac{1}{R_n}\right)$$

and making single conductive coatings on two opposite sides of the shaped body.

References Cited by the Examiner

UNITED STATES PATENTS

| | | | |
|---|---|---|---|
| 2,549,424 | 4/1951 | Carlson et al. | 333—79 |
| 2,686,274 | 8/1954 | Rooksby | 252—520 X |
| 2,694,185 | 11/1954 | Kodama | 333—79 |
| 2,925,646 | 2/1960 | Walsh | 29—155.5 |
| 2,963,773 | 12/1960 | Starr | 29—155.5 |
| 3,037,180 | 5/1962 | Linz | 29—155.71 X |
| 3,056,938 | 10/1962 | Pappis | 252—520 X |

OTHER REFERENCES

I.B.M. Technical Disclosure Bulletin, "Transistor Mounting" (Barrows), vol. 1, No. 5, February 1959.

CHARLIE T. MOON, *Primary Examiner.*

WHITMORE A. WILTZ, WILLIAM I. BROOKS,
*Examiners.*

C. I. SHERMAN, P. M. COHEN, *Assistant Examiners.*